United States Patent [19]

Hegarty

[11] Patent Number: 4,957,515
[45] Date of Patent: Sep. 18, 1990

[54] PROCESS FOR SULFUR REMOVAL AND RECOVERY FROM FUEL GAS USING PHYSICAL SOLVENT

[75] Inventor: William P. Hegarty, Allentown, Pa.

[73] Assignee: Air Products and Chemicals, Inc., Allentown, Pa.

[21] Appl. No.: 266,741

[22] Filed: Nov. 3, 1988

[51] Int. Cl.$^5$ ............................................. B01D 19/00
[52] U.S. Cl. .......................................... 55/43; 55/44; 55/73; 60/39.02
[58] Field of Search ................... 48/197 R, 203; 55/43, 55/44, 53, 68, 73; 423/573 R, 220, 226; 60/39.02, 39.12

[56] References Cited

U.S. PATENT DOCUMENTS

| | | | |
|---|---|---|---|
| 3,824,766 | 7/1974 | Valentine et al. | 55/73 |
| 4,121,912 | 10/1978 | Barber et al. | 48/197 R |
| 4,242,108 | 12/1980 | Nicholas et al. | 55/40 |
| 4,425,317 | 1/1984 | Zeller et al. | 55/68 |
| 4,430,316 | 2/1984 | Ranke et al. | 55/68 |
| 4,568,364 | 2/1986 | Galstaun et al. | 55/73 |
| 4,714,480 | 12/1987 | Wansink | 55/43 |

OTHER PUBLICATIONS

Gerhard Ranke; The Rectisol Process–for the Selective Removal of CO$_2$ and Sulfur Compounds from Industrial Gases; May 1972; pp. 25–31.

SFA Pacific, Inc.; Process Screening Study of Alternative Gas Treating and Sulfur Removal for IG-CC Power Plant Applications; Dec. 1987.

Primary Examiner—Joye L. Woodard
Attorney, Agent, or Firm—Geoffrey L. Chase; James C. Simmons; William F. Marsh

[57] ABSTRACT

A process for recovery of hydrogen sulfide-free fuel, while maintaining desirable carbon dioxide for combustion in a gas turbine to recover power in an integrated coal gasification combined cycle power plant and obtaining a rich hydrogen sulfide Claus plant feed gas is described.

3 Claims, 2 Drawing Sheets

PROCESS FOR SULFUR REMOVAL AND RECOVERY FROM FUEL GAS USING PHYSICAL SOLVENT

TECHNICAL FIELD

The present invention is a process for an integrated coal gasification combined cycle wherein a unique solvent separation allows coal gasified gas to be delivered to a gas turbine retaining the beneficial effects of carbon dioxide while deleting the harmful contaminant hydrogen sulfide and recovering a rich hydrogen sulfide Claus feed gas product. More specifically, the present invention is a process for physical solvent separation of hydrogen sulfide while allowing carbon dioxide and inert stripping gas to be reintroduced to fuel gas feed to a gas turbine to enhance power by expansion of the inert gases.

BACKGROUND OF THE PRIOR ART

In Integrated Coal Gasification Combined Cycle (IGCC) power plants the fuel gas from the $O_2$ blown coal gasification has to be desulfurized before being combusted in the gas turbine for power generation. When the gas is produced by proven coal gasification processes using a 60 wt % coal in water slurry feed, it contains about 20 (dry) mole % $CO_2$ with a sulfur content depending on the coal fed. With a low sulfur coal containing 0.5 wt % sulfur the fuel gas contains about 0.15 mole % $H_2S$ and about 0.003 mole % COS. To achieve desired $SO_2$ emission limits, 97% of $H_2S +$ COS must be removed and recovered as elemental sulfur in a Claus plant and tail gas cleanup unit (TGCU). A selective acid gas removal process is required to absorb essentially all the $H_2S$ while coabsorbing a minimum amount of $CO_2$. Minimum $CO_2$ removal is required to obtain a concentrated $H_2S$ Claus plant feed to minimize the capital and operating costs of the Claus plant and TGCU. Co-absorbtion of $CO_2$ not only dilutes the Claus $H_2S$ feed, it also decreases the IGCC power generation thermal efficiency. The $CO_2$ in the high pressure fuel gas generates power when it is expanded in the gas turbine. To the extent that $CO_2$ is removed with the $H_2S$. that power generation potential is lost. The problem is that available acid gas removal processes are not sufficiently selective and co-absorb significant $CO_2$. The most selective physical solvents, such as mixed dialkylethers of polyethylene gylcol and N methyl pyrrolidone coabsorb about 16% of the $CO_2$ when solvent flow is set to remove essentially all of the $H_2S$. With low sulfur coal gasification gas, this results in a very dilute (5 to 6 mole % $H_2S$) acid gas which can not be processed in a conventional Claus plant. In commercial practice an expensive $H_2S$ selective amine preconcentration is used to increase the Claus feed to 25% $H_2S$. Even at this concentration the TGCU is very expensive and natural gas fuel has to be fired to raise Claus reaction furnace temperature to an acceptable level.

The problem overcome by the present invention is development of an IGCC desulfurization system that gives a concentrated $H_2S$ Claus/TGCU feed and retains $CO_2$ in the fuel gas to the gas turbine to maximize power generation thermal efficiency.

The problem has been recognized by the Electric Power Research Institute (EPRI) who commissioned a study to contact experts skilled in the art of gas processing to identify promising new approaches to solve it. The study by SFA Pacific Inc. is summarized in a final report EPRI AP-5505, Project 2221-13. December 1987. Table 3-6 of the report summarizes performance data supplied by licensors of selective physical solvent and amine acid gas removal processes for low sulfur coal gasification feeds. The processes, in general obtained Claus feeds with 5 to 8% $H_2S$, except for the Purisol process which achieved 40% $H_2S$. Page 3-15 from the report, notes that the Purisol design included an $N_2$ stripping stage to enrich the Claus plant acid gas feed from 6.5 to 40% $H_2S$. It states that such a stripper is used in the Texaco. Wilmington refinery Rectisol process described in their reference "The Rectisol Process . . .", Gerhard Ranke. *Chemical Economy and Engineering Review,* May 1972. Vol. 4 No. 5 (No. 49) pp. 25–31. The $H_2S$ enrichment column is shown on FIG. 4, page 29. It operates at essentially atmospheric pressure and includes a bottom $CO_2$ stripping section surmounted by an $H_2S$ reabsorber section. In operation it uses $N_2$ to strip some of the $CO_2$ from the solvent with $H_2S$ in the stripped $CO_2$ reabsorbed with $H_2S$-free solvent in the top reabsorber section to give an $N_2$ plus $CO_2$ vent stream containing an acceptable 10 ppm of $H_2S$. While operation at low pressure minimizes the $N_2$ strip gas requirement which is directly proportional to pressure, it increases the solvent flow required to reabsorb the $H_2S$ which is inversely proportional to operating pressure. As stated on page 25 of Ranke, with physical solvent processes, absorption solvent flow is in general inversely proportional to pressure. Because the reabsorbtion solvent flow is added to the main absorber solvent for regeneration, it increases the regeneration steam requirement. When the process operates at refrigerated temperature, as many physical solvent processes such as Rectisol and Selexol do, and Purisol may, the increased regeneration solvent flow increases the refrigeration requirements. As a result, $N_2$ stripping at low pressure to obtain a concentrated Claus $H_2S$ stream is unattractive because regeneration solvent flows are excessive and result in prohibitive solvent regeneration steam and refrigeration requirements. Also, the stripped carbon dioxide along with the nitrogen strip gas is rejected to the atmosphere and does not contribute to power production in the gas turbine. Finally, note that the solvent regeneration severity has to be increased to obtain very low residual hydrogen sulfide content in the lean regenerated solvent to achieve the 10 ppm hydrogen sulfide level in the reabsorber carbon dioxide and nitrogen vent gas at low pressure.

U.S. Pat. No. 4,242,108 to Nicholas & Hegarty assigned to the present assignee solves the problem of obtaining a concentrated Claus $H_2S$ feed gas by heating the $H_2S$ absorber bottoms solvent and feeding it to a high pressure $CO_2$ stripping column operating at essentially the same pressure as the $H_2S$ absorber and stripping the coabsorbed $CO_2$ with a high pressure $CO_2$-free inert gas. It notes the possibility of using high pressure $N_2$ from an air separation unit (Col. 3. lines 7–9) in $NH_3$ plant applications. In general, it is not feasible to use nitrogen stripping gas, with the nitrogen contaminating the treated gas. This citation of $N_2$ use is limited to $NH_3$ applications where $N_2$ has to be compressed and added to the $H_2$ after acid gas removal to make $NH_3$ synthesis gas. This application merely routes a portion of the required $N_2$ through the stripper for beneficial effects. It is limited in the claims to situations where $CO_2$ has to be rejected from the product gas as in $NH_3$ synthesis.

Note also that because the strip gas requirement is directly proportional to the stripper pressure, high pressure $N_2$ stripping requirements result in high $N_2$ compression requirements, except for $NH_3$ synthesis applications where the $N_2$ must be compressed in any event.

Hot stripping at high pressure and temperature also increases refrigeration requirements for refrigerated physical solvent processes. In the Nicholas and Hegarty patent, while the lean solvent is precooled against stream 7 in heat exchanger 8, stream 7 has not been cooled by expansion and flashing as is typically done. As a result with a given cold end temperature approach in exchanger 8, the lean solvent temperature is increased and this results in an increase in net process refrigeration duty. Also operation of heat exchanger 8 precludes the use of the economical plate and frame type heat exchanger which have gaskets limited to pressures below 300 psig.

BRIEF SUMMARY OF THE INVENTION

The present invention is a process for producing a hydrogen sulfide-free fuel gas for combustion in a gas turbine to produce power using a raw fuel feed gas from an oxygen-enriched coal gasification, comprising the steps of: introducing a raw fuel feed gas from a coal gasification, which gas is contaminated with hydrogen sulfide and carbon dioxide, into a first separation zone, contacting said raw fuel feed gas with a carbon dioxide-loaded liquid solvent selective for the hydrogen sulfide in the first separation zone, removing a hydrogen sulfide-free, carbon dioxide-containing fuel gas from the first separation zone for combustion in the gas turbine with the recovery of power, removing a hydrogen sulfide-rich, carbon dioxide-containing solvent from the first separation zone and reducing the solvent in pressure separating the reduced pressure solvent into a carbon dioxide-rich stream and a second hydrogen sulfide-rich solvent containing residual carbon dioxide, stripping the residual carbon dioxide from the second hydrogen sulfide rich solvent with nitrogen rich gas at a pressure below approximately 300 psia, combining the carbon dioxide-rich stream and the residual carbon dioxide containing nitrogen stripping gas and further processing the combined stream to recycle the carbon dioxide to the hydrogen sulfide-free, carbon dioxide-containing fuel gas and stripping the hydrogen sulfide from the second hydrogen sulfide-rich solvent in regeneration zone using steam to recover a hydrogen sulfide-rich product stream and a hydrogen sulfide-lean solvent which is recycled to the first separation zone.

Preferably, the second hydrogen sulfide-rich solvent is reduced in pressure to separate residual nitrogen stripping gas from the solvent.

Preferably, the combined stream containing recycled carbon dioxide is compressed and is introduced into the raw fuel feed gas to the first separation zone.

Preferably, the hydrogen sulfide-lean solvent is combined with the hydrogen sulfide-free, carbon dioxide-containing fuel gas, cooled and separated into a carbon dioxide-loaded solvent for introduction into the first separation zone and a final hydrogen sulfide-free, carbon dioxide-containing fuel gas for introduction into the gas turbine.

Alternatively, the hydrogen sulfide-rich, carbon dioxide-containing solvent at a pressure in the range of approximately 50 to 300 psia is combined with the combined stream containing carbon dioxide and nitrogen stripping gas and the resulting stream is contacted with carbon dioxide loaded solvent in a second separation zone to recover residual hydrogen sulfide from the combined stream in the solvent and to produce a final carbon dioxide and nitrogen stream.

Preferably, the solvent after contact with said residual stream to recover hydrogen sulfide is further processed as the reduced pressure solvent.

Preferably, the final carbon dioxide and nitrogen stream is contacted with the hydrogen sulfide-lean solvent in a third separation zone to recover a carbon dioxide-loaded solvent and a carbon dioxide-lean nitrogen stream.

Preferably, the carbon dioxide-loaded solvent is split into a first solvent stream which is recycled to the first separation zone and a second solvent stream which is recycled to the second separation zone.

Preferably, the solvent is selected from the group consisting of: N-methylpyrrolidone, tributyl phosphate, tetramethylene sulfone and the dialkylethers of polyethylene glycol.

Preferably, coal is gasified with oxygen-enriched oxidant gas to produce the raw fuel feed gas.

Preferably, air is separated by cryogenics or absorption into the oxygen-enriched oxidant gas and a nitrogen separation gas.

Preferably, at least a portion of the nitrogen separation gas is used as the nitrogen-enriched stripping gas.

DETAILED DESCRIPTION OF THE INVENTION

The present invention is an improved process for sulfur removal and recovery from an $O_2$ blown integrated coal gasification combined cycle (IGCC) power generation process using an $H_2S$ selective physical solvent incorporating $N_2$ stripping at intermediate pressure of below approximately 300 psia, preferably approximately 20 to 300 psia to concentrate the reject $H_2S$ Claus gas feed stream and retain $CO_2$ in the IGCC fuel gas. Attached FIGS. 1 and 2 are simplified process flowsheets presenting two different configurations of the invention.

Figure 1:
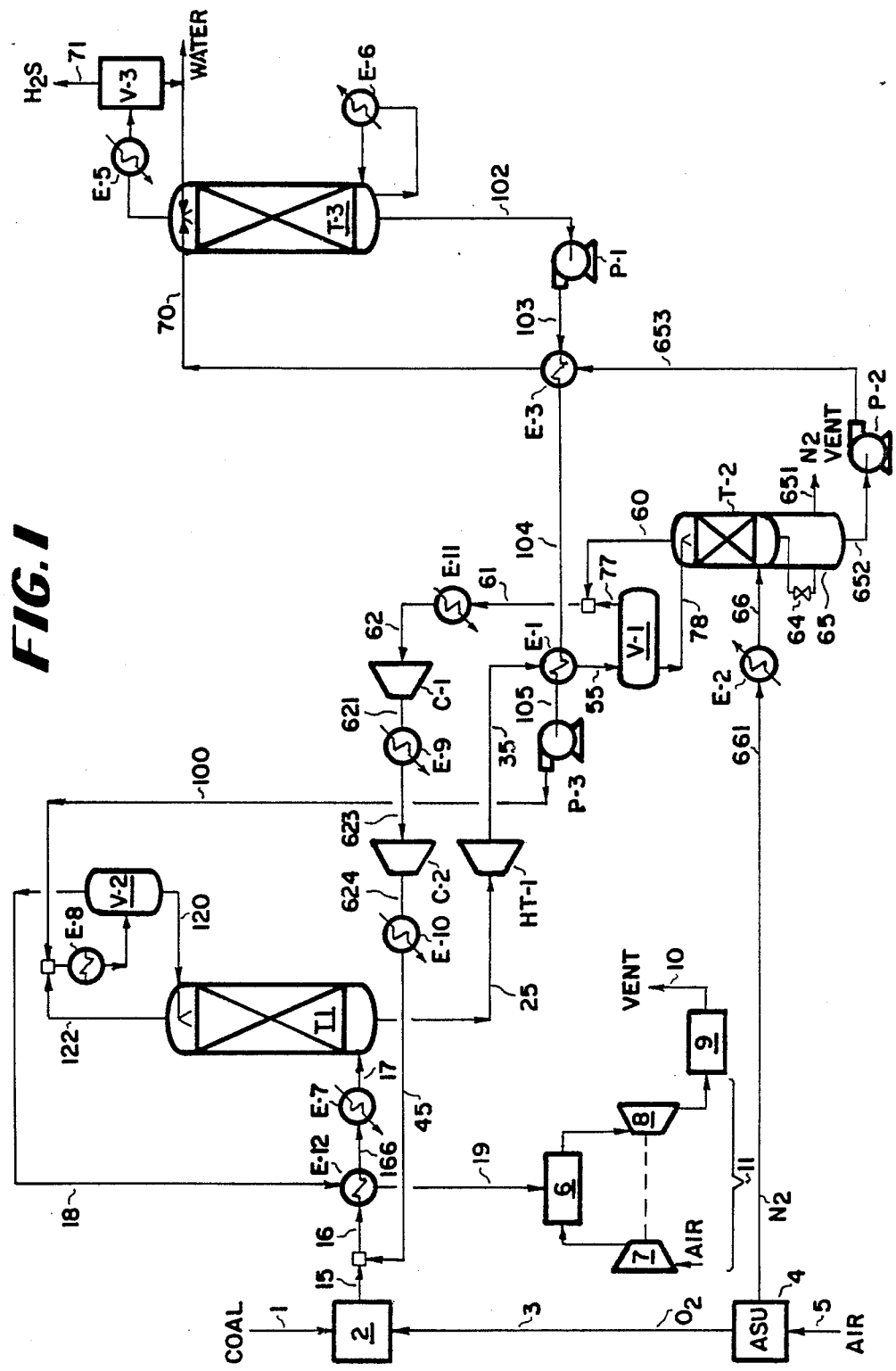
FIG. 1 is a schematic illustration of a first preferred embodiment of the present invention.
Figure 2:
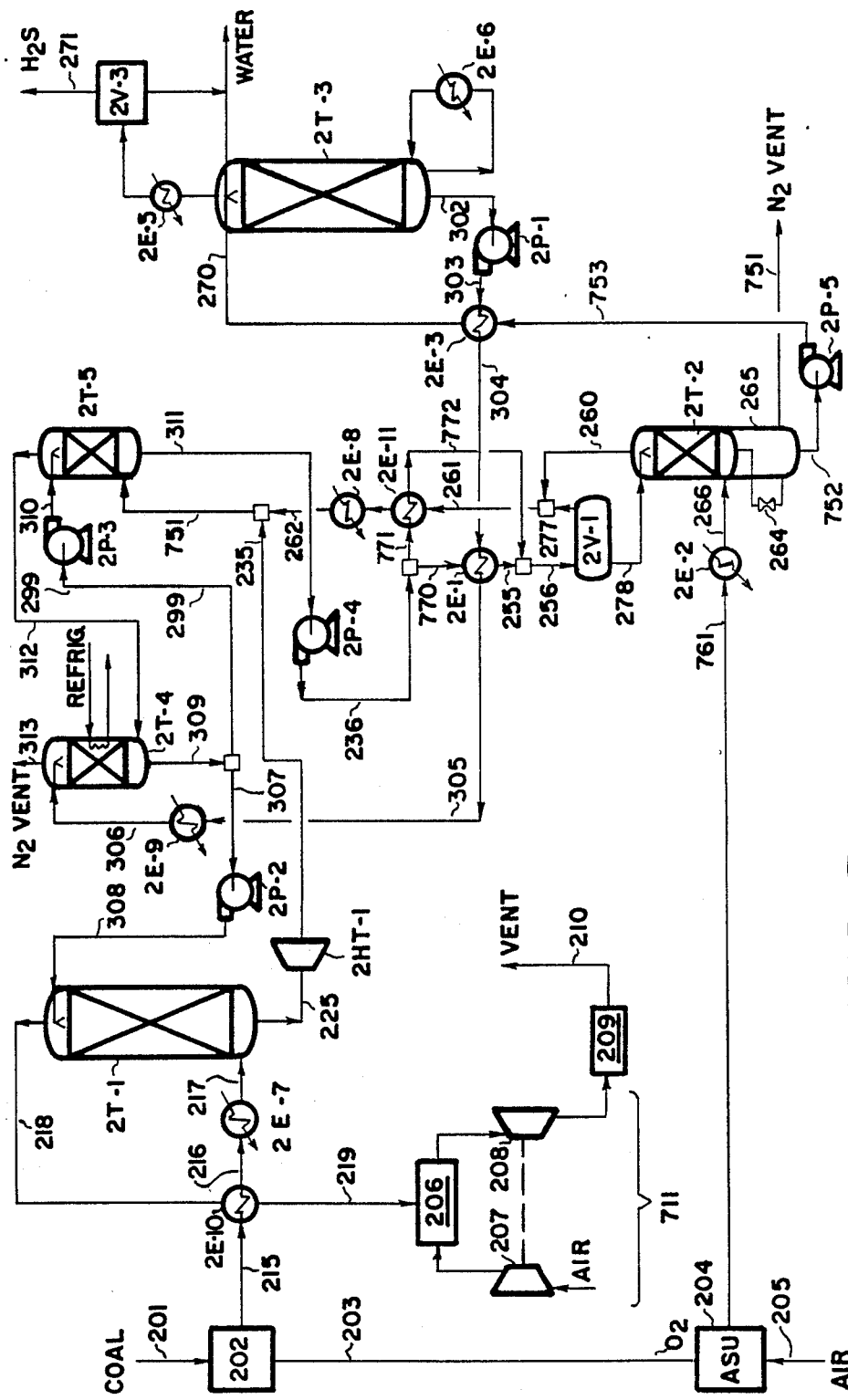
FIG. 2 is a schematic illustration of a second preferred embodiment of the present invention.

Referring to FIG. 1, coal 1 is combusted with oxygen-enriched oxidant gas 3 in a gasifier 2 using oxygen-enriched oxidant 3 from an air separation unit 4 fed with or the air 5. The unit also makes nitrogen gas 661 which is heated in E-2 to produce nitrogen-rich gas for strip duty. A raw fuel feed gas 15, at about 500 psig and cooled to ambient temperature with ash and aqueous condensate separated, after mixing with a recycled combined $CO_2+N_2$ stream 45, is cooled 16 in heat exchange E-12 and as stream 166 is cooled in heat exchanger E-7 and fed 17 to the bottom section of the $H_2S$ absorber T-1 constituting a first separation zone. Cooled, regenerated hydrogen sulfide-lean physical solvent 100 is contacted with $H_2S$-free absorber overhead gas 122 to presaturate the solvent with $CO_2$ and the combined stream is further refrigerated in E-8 to about 30° F. and the liquid phase, carbon dioxide-loaded solvent 120 is fed to the top of the absorber T-1 from phase separator V-2. The desulfurized gas constituting a hydrogen D sulfide-free fuel gas 18 is rewarmed in heat exchanger E-12 to recover refrigeration and flows 19 to the gas turbine 11 comprising a combustor 6 supplied with air from a compressor 7 driven by the expander 8 which recovers net power from the combusted fuel. Optionally, heat is recovered 9 from the combustion gas which is vented 10. In countercurrent contact in the absorber T-1, the $H_2S$ is essentially completely absorbed and about 16% of the net feed $CO_2$ is coabsorbed. The hydrogen sulfide-rich, carbon dioxide-containing solvent 25 is let down in pressure through a power recovery turbine HT-1 to about 90 psia and the solvent 35 is heated against lean solvent 104 in heat exchanger E-1 to about 175° F. and fed in line 55 to separator V-1. Liquid comprising a second hydrogen sulfide-rich solvent 78 from the separator is fed to the top of the $CO_2$ stripper T-2 at about 70 psia. Heated nitrogen-rich gas 66 is fed to the bottom of the $CO_2$ stripper and strips essentially all the residual $CO_2$ and about 45% of the $H_2S$ from the second hydrogen sulfide-rich solvent. The $CO_2$-free solvent, containing essentially all the feed $H_2S$ is flashed in valve 64 to about 25 psia in vessel bottom 65 to release the small amount of coabsorbed $N_2$ which is vented 651 to the Claus tail gas cleanup unit (TGCU) selective amine vent gas absorber to recover any minor contained $H_2S$. The second hydrogen sulfide-rich solvent 652 is pumped by P-2 and as stream 653 is heated against hot regenerated lean solvent 103 in heat exchanger E-3 and fed as stream 70 to the regenerator column T-3 comprising a regeneration zone, where the solvent is reboiled with steam in E-6 to strip $H_2S$ overhead where it is cooled in heat exchanger E-5 and phase separated in V-3 to condense $H_2O$. The hydrogen sulfide-rich product stream 71, flows to the Claus sulfur recovery unit. Net $H_2O$ entering the process is drained with the balance refluxed to the regenerator T-3 to maintain the desired solvent-$H_2O$ concentration. The hot regenerated hydrogen sulfide-lean solvent 102 is pumped to about 85 psia in P-1 and cooled against rich solvent 653 in heat exchanger E-3 and as stream 104 is cooled in heat exchanger E-1 against stream 35. The solvent 105 cooled to about 50° F. is pumped to about 545 psia in P-3 and returned in line 100 to the $H_2S$ absorber via E-8, vessel V-2 and line 120.

The flash gas 77 comprising a carbon dioxide-rich stream from the separator V-1 and the strip gas 60 comprising residual hydrogen sulfide contaminated carbon dioxide-containing nitrogen stripping gas from the $CO_2$ stripper T-2 are combined in line 61, cooled to ambient temperatures in heat exchanger E-11 and recompressed as stream 62 in compressors C1, intercooled as stream 621 in heat exchanger E-9, further compressed as 623 in compressor C2 and as stream 624 cooled in E-10 and recycled 45 to the $H_2S$ absorber T-1.

The net result of the processing is that essentially all the $H_2S$ in the raw fuel feed gas is removed as a concentrated Claus feed gas. Essentially all the $CO_2$ and the injected $N_2$ stripping gas are contained in the fuel gas, where they will contribute to power generation in the gas turbine. Regarding the process of FIG. 1, it should be noted that the carbon dioxide presaturation of the solvent 100 could also be accomplished on the top tray of the $H_2S$ absorber T-1. To hold the absorber solvent temperature to the stipulated 30° F. in the top section, however, the feed solvent would have to be cooled to a temperature below 30° F. or cooling would have to be provided on the top trays of the absorber. Also note that simple flash gas recompression, as has been practiced to concentrate $H_2S$, would not be attractive for low sulfur coal application where the $CO_2/H_2S$ ratio in the raw feed gas is very high. To remove the bulk of the $CO_2$, it would be necessary to flash to vacuum conditions. This would result in prohibitive recompression requirements.

FIG. 2 presents an alternative arrangement that eliminates the hydrogen sulfide contaminated flash gas ($CO_2+N_2$) recompression. In place of the recompression it reabsorbs $H_2S$ from the combined $CO_2+N_2$ and flash gas stream with refrigerated $CO_2$ presaturated solvent. It then absorbs the bulk of the $CO_2$ from the flash gas to presaturate hydrogen sulfide-lean solvent thereby recovering the $CO_2$ to the desulfurized fuel gas. The $N_2$ strip gas is vented. As shown in FIG. 2, coal 201 is gasified with oxygen-enriched oxidant 203 from air separation unit 204 supplied with air 205. The unit also makes nitrogen gas 761. The high pressure raw fuel feed gas 215 at about 500 psig and 100° F. is cooled in 2E-10 and in line 216 cooled further in 2E-7 and fed in line 217 to the $H_2S$ absorber 2T-1 where $H_2S$ is absorbed in refrigerated $CO_2$-loaded liquid solvent 308. The hydrogen sulfide-rich carbon dioxide-containing solvent 225 containing the absorbed $H_2S$ and coabsorbed $CO_2$ is expanded in power recovery turbine 2HT-1 to reduce its pressure, mixed in line 235 with flashed/stripped gas 262 (combined stream) and fed in line 751 to the base of the $H_2S$ reabsorber. 2T-5 constituting a second separation zone. The disengaged solvent liquid 311 containing residual hydrogen sulfide is pumped 2P-4 and in line 236 is split into stream 770 which is heated to about 175° F. against lean solvent in heat exchanger 2E-1 and stream 771 which is heated to about 175° F. against flash gas 261 in E-11. The heated, reduced pressure solvent 256 comprising 255 and 772 is fed into separator 2V-1 to separate flash gas 277 constituting a carbon dioxide-rich stream. The second hydrogen sulfide-rich solvent 278 is fed to the top of the $CO_2$ stripper 2T-2 where $CO_2$ and about 46% of the $H_2S$ is stripped with heated nitrogen-rich gas 266 from 2E-2. The stripped solvent is flashed in valve 264 to release dissolved $N_2$ in vessel bottom 265 that is vented in line 751. The solvent 752 is pumped in 2P-5 and in line 753 further heated against lean solvent in line 303 in heat exchanger 2E-3. The heated rich solvent 270 is fed to the steam reboiled 2E-6 regeneration zone 2T-3 to produce hot, regenerated, hydrogen sulfide-lean solvent 302. $H_2S$ is stripped overhead and cooled in 2E-5 to condense water in 2V-3 and recover an $H_2S$ rich product stream 271. The solvent pressure is boosted in pump 2P-1 and cooled as stream 303 against rich solvent 753 in heat exchanger 2E-3 and as stream 304 in heat exchanger 2E-1. As stream 305, it it is then refrigerated in 2E-9 and fed as stream 306 to the refrigerated $CO_2$ presaturator column 2T-4, constituting a third separation zone, where it is contacted with an $H_2S$ free, final $CO_2$ and $N_2$ stream or strip gas 312 to absorb the bulk of the $CO_2$ from the vent $N_2$ stream 313. The $CO_2$-loaded solvent 309 is split. Stream 307 is pumped in 2P-2 via line 308 to the $H_2S$ absorber 2T-1, the remainder 299 is pumped 2P-3 and fed in line 310 to the $H_2S$ reabsorber, 2T-5 or second separation zone, where it absorbs $H_2S$ from the resulting combined stream 751. The $H_2S$-loaded, reduced pressure solvent 311 from 2T-5, including the depressurized $H_2S$ absorber solvent 235 is pumped in 2P-4 as stream 236 and treated as previously described for stripping and regeneration immediately above.

Streams 277 and 260 are combined as stream 261 cooled in 2E-11 and 2E-8 and combined as stream 262 with stream 235 as described. A hydrogen sulfide-free, carbon dioxide-containing fuel gas 218 is removed from 2T-1, warmed in 2E-10 and fed via 219 to combustor 219 of gas turbine 711 which is fed with air from compressor 207 that is powered from expander 208 which is powered by combustion gases from 206. Net power is derived from 208 gases which are cooled 209 and vented 210.

In reviewing FIG. 2, it should be appreciated that an alternative configuration would be to eliminate the intermediate presaturator column 2T-4 and use $CO_2$ presaturated solvent from the FIG. 1 $H_2S$ absorber presaturator as $H_2S$ reabsorber solvent in ,FIG 2. This scheme still eliminates the flash gas recompression but loses the coabsorbed $CO_2$ with $N_2$ vent stream.

Regarding FIG. 2, it should be noted that mixing of the solvent 235 and gas 262 and feeding the mixture to the $H_2S$ reabsorber 2T-5 is advantageous in that it partially absorbs $H_2S$ and decreases the $H_2S$ absorption required in 2T-5. It also provides a gas-free solvent feed to the heat exchanger 2E-1. The process would still be practical if the gas 262 was fed directly to 2T-5 and solvent stream 235 and 236 were mixed and fed to heat exchanger 2E-1

Representative physical solvents for use in this process would include N-methyl pyrrolidone, the dialkylethers of polyethylene glycol, tributyl phosphate and tetramethylene sulfone. Note also, that to the extent that $CO_2$ is absorbed in hybrid processes combining chemically reaction solvents and physical solvents, such as the Shell Sulfinol process and the Lurgi Amisol process, these process configurations will serve to strip physically coabsorbed $CO_2$ and increase the Claus $H_2S$ feed gas concentration.

EXAMPLE 1

An IGCC power plant produces 86,700 KW of net electric power by gasifying 93675 lbs/hr of Utah Coal containing 0.5 wt % sulfur with 77,297 lbs/hr of commercial oxygen at 600 psig in a Texaco water slurried coal feed gasification system. After separating ash and cooling to ambient temperature to condense and separate water the resultant 7826 lbs moles/hr of raw fuel gas at 517 psia and 100° F. is fed to the physical solvent acid gas removal system depicted on FIG. 1. Table 1 presents the overall material balance (on a dry basis) for desulfurization of the raw fuel gas with refrigerated N-methyl pyrrolidone (NMP) physical solvent. In operation 1508 lbs moles/hr of NMP containing 4 wt % $H_2O$, 100 at 520 psia and 52° F. is mixed with the overhead gas from the $H_2S$ absorber column and refrigerated to 30° F. The $CO_2$ presaturated NMP solvent is fed to the top section of the $H_2S$ absorber to absorb $H_2S$ from the feed gas. The rewarmed treated fuel gas product (19 of FIG. 1). containing 4 ppm of $H_2S$ and 0.2 lb moles/hr of COS with 97.8% of the net feed sulfur absorbed in the rich NMP solvent, exits to the gas turbine. The rich solvent (25 of FIG. 1). leaves the absorber bottom at 37° F. After depressuring in a power recovery turbine (HT-1 of FIG. 1)and heating, the solvent enters separator (V-1 of FIG. 1) at 175° F. and 70 psia. The NMP solvent (78 of FIG. 1) is fed to the $CO_2$ stripper column where 101.2 lb moles/hr of heated $N_2$ (66 of FIG. 1) is used to strip coabsorbed $CO_2$ from the NMP. The strip gas. (60 of FIG. 1) is combined with the V-1 separator flash gas (77 of FIG. 1) and cooled and recompressed. The cooled recompressed gas (45 of FIG. 1) is mixed with the feed gas (15 of FIG. 1) for recycle to the $H_2S$ absorber (T-1 of FIG. 1).

The essentially $CO_2$ free NMP solvent is flashed to 25 psia to release dissolved $N_2$ (651 of FIG. 1) which flows to the Claus TGCU selective amine vent gas absorber to recover trace $H_2S$. The NMP solvent is heated against hot lean solvent (70 of FIG. 1) and fed to the reboiled regenerator column where 95.9% $H_2S$ (dry basis) is stripped overhead as Claus plant feed gas (71 of FIG. 1). The heated lean solvent (102 of FIG. 1) is cooled against rich solvent to 51° F. The cooled solvent (105 of FIG. 1) is pumped to 530 psia and returned to the $H_2S$ absorption step.

While this material balance is presented on a dry basis, the NMP $H_2O$ content is typically maintained at about 4 wt % to add volatility to facilitate boilup in the regenerator. NMP processes also typically include a water wash to recover vaporized and entrained NMP from column overheads and an $H_2O$ preabsorbtion step ahead of absorbers to maintain the absorber NMP water content in the desired 4 wt % range. These steps are not shown on these flowsheets because they are not germane to the invention described.

In this example 101.2 lb moles/hr of stripping $N_2$ is used. This is equivalent to about 4 mol% of the $O_2$ used in the coal gasification step. This small quantity of pure $N_2$ can be withdrawn at about 80 psia from the high pressure column of a conventional double column $O_22$ plant for stripping gas use with minimal modifications and no significant increase in energy requirements.

TABLE 1

| Material Balance - Example 1 | | | | | | |
|---|---|---|---|---|---|---|
| Stream No. | 15 | 19 | 100 | 25 | 77 | 78 |
| Pres., psia | 517 | 495 | 520 | 507 | 70 | 70 |
| Temp., °F. | 100 | 62 | 52 | 37 | 175 | 175 |
| Component lb moles/hr | | | | | | |
| CO | 3271.3 | 3271.1 | | 5.9 | 5.8 | 0.1 |
| $H_2$ | 2900.0 | 2900.0 | | 3.5 | 3.5 | 0.0 |
| $CO_2$ | 1572.0 | 1572.0 | | 254.0 | 211.2 | 42.8 |
| $H_2S$ | 11.7 | 4 ppm | | 37.6 | 16.4 | 21.2 |
| COS | 0.2 | 0.2 | | 0.1 | 0.1 | 0.0 |
| $CH_4$ | 26.6 | 26.6 | | 0.3 | 0.3 | 0.0 |
| $N_2$ | 34.1 | 133.4 | | 0.2 | 0.2 | 0.0 |
| NMP | | | 1508.0 | 1508.0 | | 1508.0 |
| Total | 7815.9 | 7903.3 | 1508.0 | 1809.6 | 237.5 | 1572.1 |

| Stream No. | 66 | 60 | 45 | 651 | 71 |
|---|---|---|---|---|---|
| Pres.. psia | 72.5 | 70 | 517 | 25 | 25 |
| Temp., °F. | 175 | 173 | 100 | 170 | 100 |
| Component moles/hr | | | | | |
| CO | | 0.1 | 5.9 | | |
| $H_2$ | | | 3.5 | | |
| $CO_2$ | | 42.8 | 254.0 | | |
| $H_2S$ | | 9.5 | 25.9 | 0.2 | 11.7 |
| COS | | | 0.1 | | |
| $CH_4$ | | | 0.3 | | |
| $N_2$ | 101.2 | 99.1 | 99.3 | 1.5 | 0.6 |
| NMP | | | | | |
| Total | 101.2 | 151.5 | 389.0 | 1.7 | 12.3 |

EXAMPLE 2

The feed gas of Example 2 is fed to the alternative process arrangement of FIG. 2. Table 2 presents the material balance for this example.

The feed gas 215 at 517 psia and 100° F. is cooled and fed to the $H_2S$ absorber 2T-1 where it is contacted with 1499 lb moles/hr of refrigerated, $CO_2$ presaturated NMP solvent 308 at 25° F. The treated gas 219, with 98.3% of the feed gas sulfur removed, is rewarmed to recover refrigeration in 2E-10 and sent to the gas turbine for power generation. 94.2% of the feed $CO_2$ is retained in the treated gas. The rich NMP solvent 225 at 32° F. is expanded in power recovery turbine 2HT-1 and fed to the $H_2S$ reabsorber. 2T-5, along with flash gas 262. The solvent, combined with the $H_2S$ reabsorber rich solvent is heated to 173° F. against lean NMP solvent in 2E-1 and fed to the separator 2V-1 which operates at 85 psia. The vapor 277 is disengaged and the solvent 278 is fed to the $CO_2$ stripper, 2T-2. 202.5 lbs moles/hr of heated $N_2$ 266 is fed to strip the $CO_2$ overhead The stripped solvent is flashed to 35 psia to release dissolved $N_2$ which is vented 751 to the TGCU vent gas amine absorber to recover contained $H_2S$. The flashed solvent is further heated in 2E-3 and fed to the regenerator 2T-3 where $H_2S$ is stripped overhead 271 and sent to the Claus sulfur recovery unit after separating and rejecting excess $H_2O$.

The flash gas 277 and stripped gas 260 are combined, cooled to recover heat and refrigerated and fed 262 to the $H_2S$ reabsorber 2T-5 where $H_2S$ is reabsorbed in $CO_2$ presaturated NMP solvent 310. The column bottoms solvent is combined with the $H_2S$ absorber solvent 235 and as previously noted heated and fed to the separator 2V-1.

The $H_2S$-free reabsorber overhead gas 312 is fed to the $CO_2$ presaturator column 2T-4 where it is contacted with refrigerated lean NMP solvent 306 to absorb and recovery $CO_2$ from the $N_2$ vent 313 and $CO_2$ presaturate the lean solvent feed 308 to the $H_2S$ absorber 2T-1.

In this example, 202.5 lb moles/hr of stripping $N_2$ are used. This is equivalent to about 8 mole % of the $O_2$ used in the coal gasification step. The $N_2$ requirement in this example, is increased over that of Example 1 because the $CO_2$ stripper solvent flow is increased by 47% to include $H_2S$ reabsorber solvent. Also in Example 2 the $CO_2$ stripper column pressure is higher and $CO_2$ stripping is more complete.

Study of Example 2 shows that operating pressure level of the $CO_2$ stripper, 2T-2, $H_2S$ reabsorber 2T-5 and $CO_2$ presaturator 2T-4 is important. High operating pressure has definite advantages compared to operating near atmospheric pressure. If the operating pressure were reduced from 85 to 20 psia, the solvent flow required for $H_2S$ reabsorption would increase in inverse proportion to the pressure as indicated by Ranke. Solvent 310 NMP flow would increase from 713 to 3030 lb. moles/hr. The solvent regenerator 2T-3 reboil steam requirements would be increased 105%. Solvent refrigeration requirements would also be increased 105%. Solvent regeneration steam requirements would be further increased because more severe regeneration would be required. To maintain the 7 ppm $H_2S$ content in the $H_2S$ reabsorber overhead gas 312, $H_2S$ content of the regenerated solvent 302 would have to be decreased 76%. Note also that $CO_2$ recovery in the preabsorber would be drastically reduced. Complete $CO_2$ recovery in the $CO_2$ presaturator 2T-4 requires that the partial pressure of $CO_2$ in the presaturator feed gas 312 be less than that of $CO_2$ in the $H_2S$ absorber 2T-1 feed gas 215.

Because the $CO_2$ partial pressure in the feed gas 215 is 100 psia, less than 20% of the $CO_2$ would be recovered in the presaturator in operation at 20 psia.

TABLE 2

Material Balance - Example 2

| Stream No. | 215 | 219 | 308 | 225 | 277 | 2 |
|---|---|---|---|---|---|---|
| Pres., psia | 517 | 495 | 520 | 506 | 85 | 85 |
| Temp., °F. | 100 | 70 | 28 | 32 | 173 | 173 |
| Component lb moles/hr | | | | | | |
| CO | 3271.3 | 3265.4 | | 5.9 | | |
| $H_2$ | 2900.0 | 2890.8 | 0.1 | 9.3 | 0.1 | |
| $CO_2$ | 1572.0 | 1481.0 | 139.7 | 230.7 | 142.0 | 83.0 |
| $H_2S$ | 11.7 | 4 ppm | | 11.7 | 5.9 | 21.8 |
| COS | 0.2 | 0.2 | 0.1 | 0.1 | 0.1 | 0.1 |
| $CH_4$ | 26.6 | 26.3 | | 0.3 | | |
| $N_2$ | 34.1 | 34.8 | 0.8 | 0.1 | 1.2 | |
| NMP | | | 1498.7 | 1498.7 | | 2211.6 |
| Total | 7815.9 | 7698.5 | 1639.4 | 1756.8 | 149.3 | 2316.5 |

| Stream No. | 266 | 260 | 310 | 312 | 313 | 751 | 271 |
|---|---|---|---|---|---|---|---|
| Pres., psia | 88 | 87 | 107 | 86 | 85 | 25 | 25 |
| Temp., °F. | 175 | 170 | 27 | 27 | 35 | 168 | 100 |
| Component, lb moles/hr | | | | | | | |
| CO | | | | 5.9 | 5.9 | | |
| $H_2$ | | | | 9.3 | 9.2 | | |
| $CO_2$ | | 83.0 | 66.4 | 297.1 | 90.9 | | |
| $H_2S$ | | 10.0 | | 7 ppm | 9 ppm | 0.2 | 11.5 |
| COS | | 0.1 | | 0.1 | 8 ppm | | |
| $CH_4$ | | | | 0.3 | 0.3 | | |
| $N_2$ | 202.5 | 198.9 | 0.4 | 199.4 | 198.2 | 2.7 | 0.9 |
| NMP | | | 712.9 | | | | |
| Total | 202.5 | 292.0 | 779.7 | 512.1 | 304.5 | 2.9 | 12.4 |

The present invention solves the problem of obtaining a concentrated Claus $H_2S$ feed and of retaining the $CO_2$ content of the IGCC fuel gas as fed to the gas turbine to maximize power recovery by using a small amount of $N_2$ obtained from the IGCC's oxygen plant under pressure to strip coabsorbed $CO_2$ from the rich physical solvent for recycle to the fuel gas free of $H_2S$. In the FIG. 1 arrangement the stripper gas including the $N_2$. is recompressed into the $H_2S$ absorber feed for desulfurization with the raw fuel gas. In the FIG. 2 configuration the stripper gas is desulfurized with lean solvent in a reabsorber and the bulk of the $CO_2$ is absorbed in the lean solvent enroute to the fuel gas $H_2S$ absorber in a refrigerated $CO_2$ presaturater. In this case, the $N_2$ which was injected for stripping is vented from the presaturater.

Previous attempts to use $N_2$ to strip coabsorbed $CO_2$ from physical solvents have been either at high pressure, at essentially the same pressure as the $H_2S$ absorption, or at essentially atmospheric pressure. Because stripping gas requirement increases in direct proportion to pressure, compressing the increased quantity of $N_2$ to the higher pressure is only practical in the case where $NH_3$ synthesis gas is being produced and the $N_2$ compression is already required. The high operating pressure of the $CO_2$ stripper column also precludes use of the economical gasketed plate and frame type rich/lean solvent heat exchangers.

The present invention has been set forth with regard to two preferred embodiments, however, the full scope of the invention should be ascertained from the claims which follow.

I claim:

1. A process for producing a hydrogen sulfide-free fuel gas for combustion in a gas turbine to produce power using a raw fuel feed gas from an oxygen-enriched gasification, comprising the steps of:

(a) introducing a raw fuel feed gas from a gasification, which gas is contaminated with hydrogen sulfide and carbon dioxide, into a first separation zone;

(b) contacting said raw fuel feed gas with a carbon dioxide-loaded liquid solvent selective for said hydrogen sulfide in said first separation zone;

(c) removing a hydrogen sulfide-free, carbon dioxide-containing fuel gas from said first separation zone, combusting the fuel gas in a gas turbine and recovering power from the gas turbine;

(d) removing a hydrogen sulfide-rich, carbon-dioxide-containing solvent from said first separation zone, reducing said solvent in pressure and combining it with either the combined stream containing carbon dioxide and nitrogen stripping gas of step (h) or the second hydrogen sulfide-rich solvent of step (e);

(e) separating at least the combined stream of step (h) into a final carbon dioxide and nitrogen stream and a second hydrogen sulfide-rich solvent containing residual carbon dioxide by contacting at least the combined stream with a carbon dioxide-loaded solvent in a second separation zone;

(f) separating a carbon dioxide-rich stream containing residual hydrogen sulfide from said second hydrogen sulfide-rich solvent containing residual carbon dioxide;

(g) stripping said residual carbon dioxide containing residual hydrogen sulfide from said second hydrogen sulfide-rich solvent of step (f) with nitrogen-rich gas at a pressure below approximately 300 psia;

(h) combining said carbon dioxide-rich stream of step (f) and the residual carbon dioxide containing nitrogen stripping gas of step (g) to produce a combined stream containing carbon dioxide and nitrogen stripping gas;

(i) stripping the hydrogen sulfide from said second hydrogen sulfide-rich solvent in a regeneration zone using steam to recover a hydrogen sulfide-rich product stream and a hydrogen sulfide-lean solvent; and (j) contacting the final carbon dioxide and nitrogen stream of step (e) with the hydrogen sulfide-lean solvent of step (i) in a third separation zone to recover a carbon dioxide-loaded liquid solvent for introduction in said first separation zone and to recycle carbon dioxide to said fuel gas of step (c).

2. The process of claim 1 wherein the carbon dioxide-loaded liquid solvent of step (b) is split into the carbon dioxide-loaded liquid solvent which is recycled to said first separation zone and a carbon dioxide-loaded solvent which is recycled to said second separation zone.

3. A process for producing a hydrogen sulfide-free fuel gas for combustion in a gas turbine to produce power using a raw fuel feed gas from an oxygen-enriched gasification, comprising the steps of:

(a) introducing a raw, fuel feed gas from a gasification, which gas is contaminated with hydrogen sulfide and carbon dioxide, into a first separation zone;

(b) contacting said raw fuel feed gas with a carbon dioxide-loaded liquid solvent selective for said hydrogen sulfide in said first separation zone;

(c) removing a hydrogen sulfide-free, carbon dioxide-containing fuel gas from said first separation zone, combusting the fuel gas in a gas turbine and recovering power from the gas turbine;

(d) removing a hydrogen sulfide-rich, carbon dioxide-containing solvent from said first separation zone, reducing said solvent in pressure and combining it with either the combined stream containing carbon dioxide and nitrogen stripping gas of step (h) or the second hydrogen sulfide-rich solvent of step (e);

(e) separating at least the combined stream of step (h) into a final carbon dioxide and nitrogen stream and a second hydrogen sulfide-rich solvent containing residual carbon dioxide by contacting at least the combined stream with a carbon dioxide-loaded solvent in a second separation zone;

(f) separating a carbon dioxide-rich stream containing residual hydrogen sulfide from said second hydrogen sulfide-rich solvent containing residual carbon dioxide;

(g) stripping said residual carbon dioxide containing residual hydrogen sulfide from said second hydrogen sulfide-rich solvent of step (f) with nitrogen-rich gas at a pressure below approximately 300 psia;

(h) combining said carbon dioxide-rich stream of step (f) and the residual carbon dioxide containing nitrogen stripping gas of step (g) to produce a combined stream containing carbon dioxide and nitrogen stripping gas; and (i) stripping the hydrogen sulfide from said second hydrogen sulfide-rich solvent in a regeneration zone using steam to recover a hydrogen sulfide-rich product stream and a hydrogen sulfide-lean solvent which is recycled to said first separation zone.

* * * * *